United States Patent
Commons et al.

(10) Patent No.: US 10,445,807 B1
(45) Date of Patent: Oct. 15, 2019

(54) ENHANCED CUSTOMER SHOPPING EXPERIENCE IN PHYSICAL STORE LOCATIONS

(71) Applicant: Amazon Technologies, Inc., Reno, NV (US)

(72) Inventors: Peter Varnum Commons, Issaquah, WA (US); David John Edwards, Jr., Woodinville, WA (US); Tony Jay Lee, Woodinville, WA (US); Llewellyn James Mason, Seattle, WA (US); Scott James McKee, Seattle, WA (US); Elton Victor Pinto, Seattle, WA (US); Brandon William Porter, Yarrow Point, WA (US); Tyson Christopher Trautmann, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 812 days.

(21) Appl. No.: 13/689,450

(22) Filed: Nov. 29, 2012

(51) Int. Cl.
 *G06Q 30/06* (2012.01)
(52) U.S. Cl.
 CPC .................. *G06Q 30/0623* (2013.01)
(58) Field of Classification Search
 CPC .................................... G06Q 30/0601
 USPC .................... 705/26.1, 27.1, 26.61
 See application file for complete search history.

(56) References Cited

U.S. PATENT DOCUMENTS

| | | | | |
|---|---|---|---|---|
| 5,482,139 A * | 1/1996 | Rivalto | ...................... | E04H 3/04 186/36 |
| 7,443,295 B2 * | 10/2008 | Brice | ...................... | B62B 3/1424 235/385 |
| 7,792,710 B2 * | 9/2010 | Bonner | ...................... | H04L 67/12 370/406 |
| 8,626,611 B2 * | 1/2014 | Bravo | ...................... | G01C 21/20 235/375 |
| 8,886,125 B2 * | 11/2014 | Agrawal | ...................... | H04W 76/14 455/41.3 |
| 9,230,387 B2 * | 1/2016 | Stiernagle | ...................... | G07F 9/023 |
| 9,428,336 B2 * | 8/2016 | Hagen | ...................... | G07F 11/165 |
| 2001/0002448 A1 * | 5/2001 | Wilson | ...................... | G06F 19/3462 700/233 |
| 2002/0016740 A1 * | 2/2002 | Ogasawara | ...................... | G06Q 30/02 705/26.1 |
| 2003/0132298 A1 * | 7/2003 | Swartz | ...................... | G06K 17/00 235/472.02 |
| 2005/0097037 A1 * | 5/2005 | Tibor | ...................... | G06K 9/00006 705/39 |

(Continued)

*Primary Examiner* — Alexis M Casey
(74) *Attorney, Agent, or Firm* — Lee & Hayes, P.C.

(57) ABSTRACT

This disclosure is directed to, in part, providing customers with an enhanced shopping experience during a visit to a physical store location. The enhanced shopping experience may include providing the customer with customized delivery of product information. The product information may include demonstrations of product use, samples of products, recommendations of related products or areas of interest to a customer, etc. To provide the customized information, the customer may register to be identified while at the physical store location. The physical store location may include sensors that identify a location of the registered customer. A presentation module may then push relevant content to a device located near the customer, possibly in response to a request from the customer and/or a location of the customer.

27 Claims, 8 Drawing Sheets

(56) References Cited

U.S. PATENT DOCUMENTS

| | | | | |
|---|---|---|---|---|
| 2006/0293968 | A1* | 12/2006 | Brice | B62B 3/1424 |
| | | | | 705/14.63 |
| 2007/0118436 | A1* | 5/2007 | McDowell | G06Q 30/06 |
| | | | | 705/26.1 |
| 2007/0157220 | A1* | 7/2007 | Cordray | H04H 60/65 |
| | | | | 725/9 |
| 2007/0283268 | A1* | 12/2007 | Berger | G06F 17/30817 |
| | | | | 715/716 |
| 2007/0284442 | A1* | 12/2007 | Herskovitz | G06Q 20/18 |
| | | | | 235/383 |
| 2012/0089470 | A1* | 4/2012 | Barnes, Jr. | G06Q 10/1053 |
| | | | | 705/16 |
| 2013/0073405 | A1* | 3/2013 | Ariyibi | G06Q 30/02 |
| | | | | 705/17 |
| 2014/0122697 | A1* | 5/2014 | Liu | G06F 17/30867 |
| | | | | 709/224 |

* cited by examiner

ENHANCED CUSTOMER SHOPPING EXPERIENCE IN PHYSICAL STORE LOCATIONS

BACKGROUND

Physical store locations provide customers with an opportunity to handle a tangible, physical item, consult with employees about recommendations or alternatives, and interact with other customers. A physical retail location may provide a better customer experience in some ways than an electronic marketplace.

However, electronic marketplaces have an ability to track a large amount of information about every selection or action of a user, and then create a tailored electronic shopping experience that uses this information. For example, electronic marketplaces often provide recommendations to users after the electronic marketplace gathers enough information about a user to generate the recommendations. Electronic marketplaces also can quickly provide product information or other data to users upon request or in response to an event. Users can listen to sample clips of songs, view product specifications, and access user reviews while interacting with many different electronic marketplaces. Although some of these types of information may be available in a physical store location, albeit in different forms, it is often infrequently provided to shoppers due to cumbersome means of distribution or other obstacles of delivery to or access by the shoppers.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to, in part, providing customers with an enhanced shopping experience during a visit to a physical store location. The enhanced shopping experience may include providing the customer with customized delivery of product information. For example, the product information may include demonstrations of product use, samples of products, recommendations of related products or areas of interest to a customer, and so forth.

To provide the customized information, the customer may register to be identified while at the physical store location or other zone. For example, the customer may register with a service using a special application ("app") that is executed on an electronic device, such as a smart telephone or tablet computer, and is in communication with store servers associated with the physical store location. In some instances, historical information about the customer may be accessible after the registration, such as when the store servers access customer information associated with shopping history at an electronic marketplace, customer preferences, and/or other data.

The physical store location may include sensors that identify a location of the registered customer. A presentation module may then push relevant content to a device located near the customer, possibly in response to a request from the customer and/or a location of the customer. The relevant information may be based on information about the customer that is collected during the customer's visit to the physical store location and/or information known about the customer prior to the customer's current shopping experience.

In some embodiments, the physical store location may update displays or provide customized demonstrations for a customer, possibly based on feedback from the customer during a shopping experience. For example, when a customer indicates that he/she likes a particular item, an electronic assistant may direct the customer to another zone or area of the physical store location that may be of interest to the customer. In some instances, a distribution mechanism may move possible items of interest into a location that is viewable by the customer.

The techniques and systems described herein may be implemented in a number of ways. Example implementations are provided below with reference to the following figures.

Illustrative Environment

Figure 1:
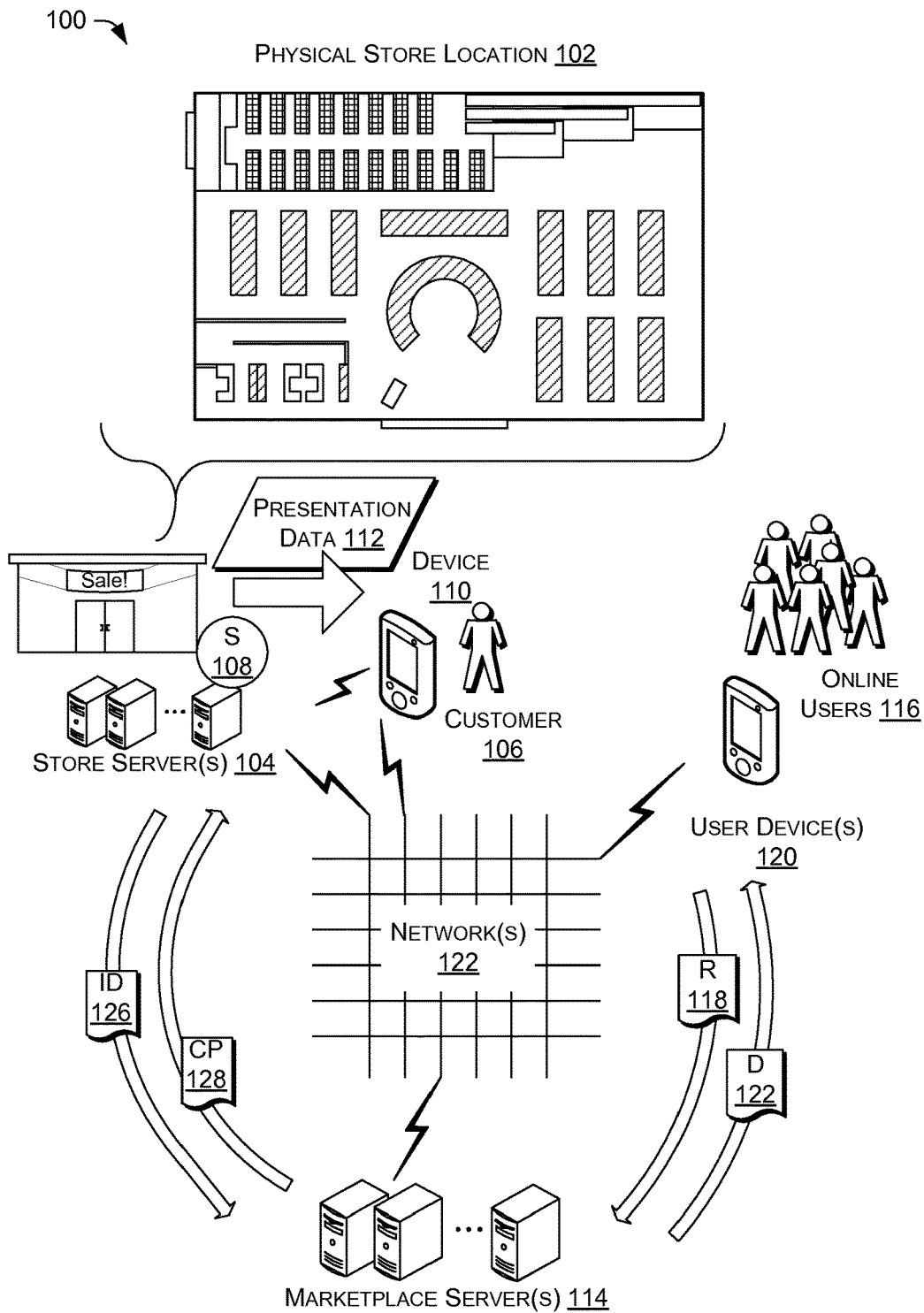
FIG. 1 is a schematic diagram of an illustrative environment usable to provide enhanced shopping experiences in physical store locations, including customized delivery of product information.

FIG. 1 is a schematic diagram of an illustrative environment 100 usable to provide an enhanced shopping experience in a physical store location, including customized delivery of product information to a customer. The environment 100 may include a physical store location ("store") 102 and store servers 104 to control at least some functionality of operations at the store. The store 102 may provide a display of physical items that a customer 106 can interact with, touch, or otherwise experience. In some embodiments, the store 102 may be a retail store that stocks items for sale to customers and includes at least some display items for interaction by the customers.

In accordance with various embodiments, the store servers 104 may be in communication with one or more sensors 108 that can identify a device 110 associated with the customer 106. The sensors 108 may include cameras, radio frequency identifier (RFID) sensors, optical sensors, receivers, transceivers, biometric sensors, and/or other types of sensors. The customer 106 may register the device 110 with the store servers 104, which may allow the store servers 104 to provide presentation data 112 to the customer 106 during a shopping experience at the store 102. The presentation data 112 may be provided, at least partially, through the device 110 and/or may be provided by other store devices (e.g., fixed devices in the store 102, etc.).

Initially, the customer 106 may register to be identified while at the store 102. For example, the customer 106 may register using a special application ("app") that is executed on the device 110, such as a smart telephone or tablet computer, and is in communication with the store servers 104 and detectable by the sensors 108. In some instances, the customer may register by presenting the device 110 that is detectable by the sensors and is associated with the customer 106.

Accordingly, the device 110 may be an electronic device or other type of device that can be identified by the sensors 108. For example, the device 110 may be an electronic device that includes a detectable signal, image, or other feature for detection using optical detection, radio waves, or other types of communications. However, the device 110 may also be a tag that can be identified by the sensors 108, such as a plastic card that includes a barcode, a quick response (QR) code, a radio frequency identifier (RFID) code, or other type of code. In some instances, the customer 106 may be associated with the tag prior to commencement of the shopping, such as when the identifier or code is stored for repeat use.

In some embodiments, the device 110 may be owned or operated by an operator of the store 102, and thus lent to the customer 106 during the customer's visit to the store. For example, the user may borrow an RFID card, a tablet computer, or other device for use while shopping at the store 102. The borrowed item (e.g., the RFID card, the tablet computer, the other devices) may be sensed by the sensors 108 while the customer shops at the store 102.

In accordance with one or more embodiments, the customer 106 may be identified using biometrics, such as through use of a retinal scan (eye scan), fingerprint, and/or other biometric data to identify a person. In such embodiments, the biometric data may be used with the device 110 or in lieu of the device 110. When biometrics are used to track a customer, the customer may still be registered and consent to use of the biometrics, as discussed above.

After registration of the customer 106, the store servers 104 may use the sensors 108 to identify the customer 106 at various locations within the store 102 and then provide the presentation data 112 to the customer 106 via hardware associated with the store (e.g., display monitors, speakers, etc.) and/or via data transmitted to the device 110 when the device 110 is an electronic device capable of receiving data that can be presented to the customer 106 in a meaningful way (e.g., output text, imagery (still pictures and/or videos), and/or sound, etc.).

The presentation data 112 may include product recommendations, product demonstrations, samples (e.g., sample music, sample videos, sample beverage, sample item, etc.), and/or other relevant data to enhance a shopping experience of the customer 106. The presentation data 112 may be provided to the customer 106 in response to a request from the customer or in response to another event or action. For example, when the customer enters a particular zone in the store 102, as identified by one of the sensors 108, the presentation data 112 may be provided to the customer such as information about a nearby product. The presentation data 112 may be presented using a display screen (e.g., display of the device 110 and/or nearby store display), a sample of music known to be liked by the customer 106 may be played for the customer, and/or other types of information may be provided to the customer 106. The presentation data 112 may be based on one or more factors, such as requests from the customer 106, history about the customer (which may include information obtained prior to the registration and or personal preferences of the customer), location within the store 102, and/or other types of data.

In some embodiments, the store servers 104 may leverage information available from other sources to obtain product information and/or information about the customer 106. In accordance with one or more embodiments, the store servers 104 may be in communication with marketplace servers 114 that may host an electronic marketplace that offers items for consumption by the online users 104. The items may be viewed, purchased, rented, leased, borrowed, or otherwise made available to the online users 104. Further, the items may be physical items, digital items, services, and/or any other product that the online users 104 may consume. For example, the marketplace servers 114 may provide an electronic catalog that is accessible to the online users 104 for browsing. The online users 104 may access the electronic catalog to purchase the items, read reviews, provide feedback, and/or otherwise interact with the marketplace servers 114.

In accordance with various embodiments, the marketplace servers 114 may exchange information with online users 116, which may include the customer 106. Through these exchanges of information (and other exchanges of data), the marketplace servers 114 may obtain transaction information (e.g., items sold), information about the online users 116 and the customer 106 (e.g., location, purchasing habits, etc.), item information (e.g., size of items, etc.), user interaction information (e.g., page views, review information, etc.), and/or other data. In some instances, the online users 116 may transmit requests 118, via user devices 120, to the marketplace servers 114. In response, the servers 114 may transmit data 122 to the user devices 110. The requests 118 and the data 122 may be exchanged via one or more networks 124.

The user devices 120 may include mobile telephones, smart phones, tablet computers, laptop computers, netbooks, personal digital assistances (PDAs), gaming devices, media players, and/or any other computing devices that can connect to a network(s) 124 to exchange information with the marketplace servers 114. The networks 124 may include wired and/or wireless networks that enable communications between the various computing devices described in the environment 100. In some embodiments, the network(s) 124 may include local area networks (LANs), wide area networks (WAN), mobile telephone networks (MTNs), and other types of networks. The marketplace servers 114 may be configured in a distributed (e.g., server farm, etc.) or non-distributed configuration.

Meanwhile, the marketplace servers 114 may exchange information with the store servers 104. In some embodiments, the store servers 104 may transmit an identifier (ID) 126 of the customer 106 to the marketplace servers 114. The marketplace servers 114 may in turn provide customer profile information 128, which may include information known about the customer from interactions with marketplace servers 114. The marketplace servers 114 may also provide other types of information to the store servers 104, such as recommendations, item reviews, item specifications, and so forth. Therefore, the communications between the store servers 104 and the marketplace servers 114 may include customer data, presentation data, and/or other types of data or requests for data.

Figure 2A:
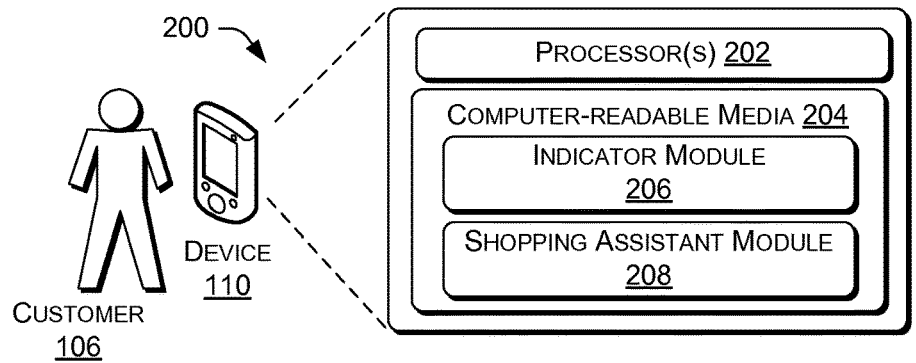
FIGS. 2A-2C are block diagrams of illustrative computing architecture of various devices included in the environment of FIG. 1.
Figure 2B:
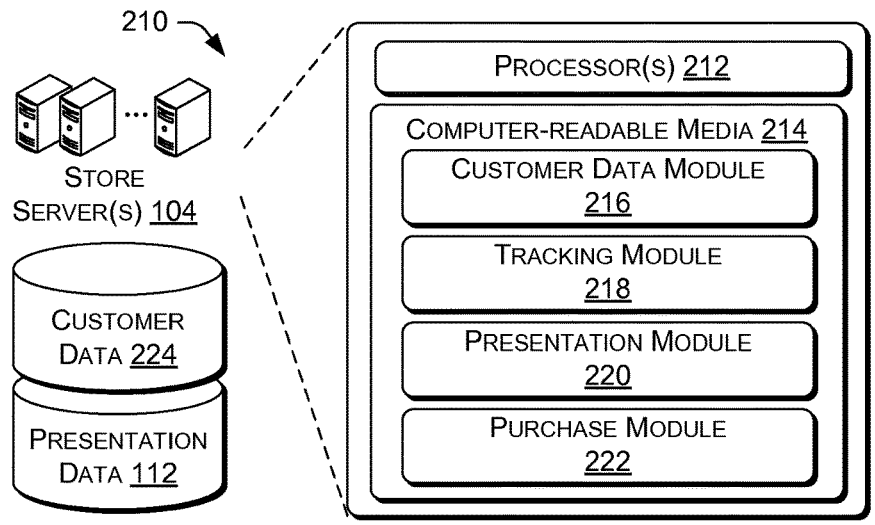
Figure 2C:
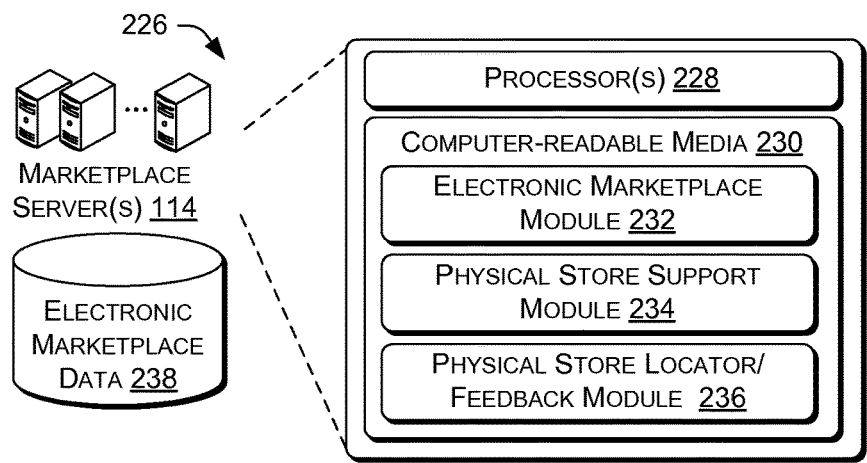

FIGS. 2A-2C are block diagrams of illustrative computing architecture of various devices included in the environment of FIG. 1. The discussion below of operations of modules included in the architecture is for illustrative purposes. The various modules may perform other operations as described throughout this description.

FIG. 2A shows an illustrative computing architecture 200 of an illustrative version of the device 110 associated with the customer 106. The architecture 200 may include processor(s) 202 and computer-readable media 204. The computer-readable media 204 may store various modules, applications, programs, or other data. The computer-readable media 204 may include instructions that, when executed by the processor(s) 202, cause the processor(s) to perform the operations described herein for the device 110. As discussed above, some implementations of the device 110 may be limited to providing identification information to allow the store servers 104 to identify the customer 106 at various times and/or at various locations in the store 102. However, the architecture 200 provides architecture for the device 110 being an electronic device that includes additional functionality. In some embodiments, the computer-readable media 204 may store an indicator module 206 and a shopping assistant module 208, each described in turn.

In some embodiments, the indicator module 206 may provide an indication that, when sensed by the sensors 108, enables the store servers 104 to identify the customer 106 associated with the device 110. In some instances, the sensors 108 may provide location information to allow the store servers 104 to location the customer 106 within the stores, or the store servers 104 may identify the location based on which of the sensors 108 where used to identify the customer 106. In various embodiments, the indicator module 206 may determine location information, such as by using global positioning system (GPS) data or equivalent data to identify a location of a person or object and then transmit the location and identification information to the store servers 104, possibly via the sensors 108.

The shopping assistant module 108 may provide the presentation data 112 and/or other data to the customer 106 based on the information provided by the indicator module 206. For example, the shopping assistant module 108 may provide information about a nearby product, provide an auditory or visual sample, and/or may provide other information for consumption by the customer 106, which may be based on the location of the customer and/or an identity of the customer. An example of a user interface of the shopping assistant module 208 is shown and described with reference to FIG. 7.

FIG. 2B shows illustrative computing architecture 210 of the store servers 104. The architecture 210 may include processor(s) 212 and computer-readable media 214. The computer-readable media 214 may store various modules, applications, programs, or other data. The computer-readable media 214 may include instructions that, when executed by the processor(s) 212, cause the processor(s) to perform the operations described herein for the servers 104. In some embodiments, the computer-readable media 214 may store a customer data module 216, a tracking module 218, a presentation module 220, and a purchase module 222. In various embodiments, the architecture 212 may include data storage for customer data 224 and presentation data 112. Each of the modules is discussed in turn.

The user data module 216 may collect information about the customer 106 during the customer's shopping experience at the store 102 and, in some instances, prior to the customer's shopping experience at the store. The information may be stored as the customer data 224 in a storage device. The information may include locations that the customer 106 visited while in the store 102, items interacted with by the customer 102, data requested by the customer 102, and so forth. In some embodiments, the user data module 216 may receive information about the customer 106 from external sources, such as from the marketplaces servers 114. The information from the external sources may include user preferences, past user transactions, user recommendations, and/or other data captured and/or derived from data captured by the external sources.

The tracking module 218 may track a location of the customer 106 in the store 102 after the customer registers and consents to the tracking. The tracking may be performed by locating and identifying the customer using the sensors 108 that read an identifier of the device 110 associated with the customer 106. In some embodiments, the tracking module 218 may receive location information and identification information from the device 110, such as when the device 110 includes GPS or other location identification hardware/software and can report this information to the store servers 104 via the sensors 108. In various embodiments, the tracking module 218 may use biometrics, such as retinal scans (eye scans), fingerprints, and/or other biometric data to identify a person. The tracking module 218 may also determine additional information about the customer, such as by determining an item the customer is likely viewing based on a direction of sight of the customer and/or a direction that the customer is standing, an analysis of an item held by the customer (via image recognition, etc.), and so forth. In such embodiments, the sensors 108 may include cameras.

The presentation module 220 may present various pieces of the presentation data 112 to the customer. Some of the presentation data 112 may be presented based on the location of the customer 106 (as determined by the tracking module 218) and/or based on the customer data 224 maintained by the customer data module 216). For example, the tracking module 218 may determine that the customer 106 is near a particular item in the store 102. In response, the presentation module 220 may provide some of the presentation data 112 about the item to the customer 106 via the device 110 and/or via other output hardware located near the customer (e.g., nearby speakers, nearby display monitors, etc.).

In some embodiments, speakers may emit audio using sound cones that direct the audio to the customer 106 such that the audio is substantially in audible within a threshold distance from the customer's position. This may allow the store servers 104 to provide personalized audio, such as suggestions, music, and/or other sounds to the customer without disrupting other customers. The sound cone experience may be achieved by use of many speakers located throughout the store 102, as discussed with reference to FIG. 4. Personalized sound may also be provided by the outputting sound to the device 110 and/or a headset.

In some embodiments, the presentation module 220 may provide interactive content via the presentation data 112. The presentation module 220 may enable the user to request additional information, request personal assistance from another person, and/or perform other functions to receive information about the items in the store 102 and/or the store itself. The presentation module 220 may also provide recommendations of items or locations in the store 102 that may be of interest to the customer 106. The presentation data 112 may be provided, at least in part, by external entities, such as from the marketplace servers 114 that may have access to unique information such as item reviews, recommendations, digital product information, and/or other relevant data.

The purchase module 222 may enable the customer 106 to purchase or otherwise obtain an item (including goods and/or services) at the store 102. The purchase module 222 may enable the customer 106 to obtain the item without having to present the item to a cashier. For example, the item may be stored in a virtual cart, paid for by the customer, and then picked up as the customer exits the store.

FIG. 2C shows illustrative computing architecture 226 of the marketplace servers 114. The architecture 226 may include processor(s) 228 and computer-readable media 230. The computer-readable media 230 may store various modules, applications, programs, or other data. The computer-readable media 230 may include instructions that, when executed by the processor(s) 228, cause the processor(s) to perform the operations described herein for the marketplace servers 114. In some embodiments, the computer-readable media 230 may store an electronic marketplace module (EMM) 232, a physical store support module 234, and a physical store locator/feedback module 236. In various embodiments, the architecture 226 may include data storage for electronic marketplace data 238. Each of the modules is discussed in turn.

The EMM 232 may support an electronic marketplace that offers items for consumption by the online users 116. The EMM 232 may support collection, maintenance, and distribution of data necessary to support the electronic marketplace. The EMM 232 may store the electronic marketplace data 238 in data storage. The electronic marketplace data 238 may include information about items, recommendations relationships, media content, information about the online users 116, transaction information, and/or any other data captured or distributed by a host of an electronic marketplace.

The physical store support module 234 may provide at least a portion of the electronic marketplace data 238 to the store servers 104 to populate the customer data 224 and/or the presentation data 112. The physical store support module 234 may receive requests from the store servers 104, and in response, provide data from the electronic marketplace data 238.

The physical store locator/feedback module 236 may provide a central repository to collect information and feedback from customers of physical store locations. The physical store locator/feedback module 236 may also recommend other physical store locations to a customer in response to a request, such as to enable to customer to locate a stocked item when the store 102 is out of stock of the particular item.

Illustrative Operations

FIGS. 3, 5, 6, and 8 show various processes to provide retail inventory management. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
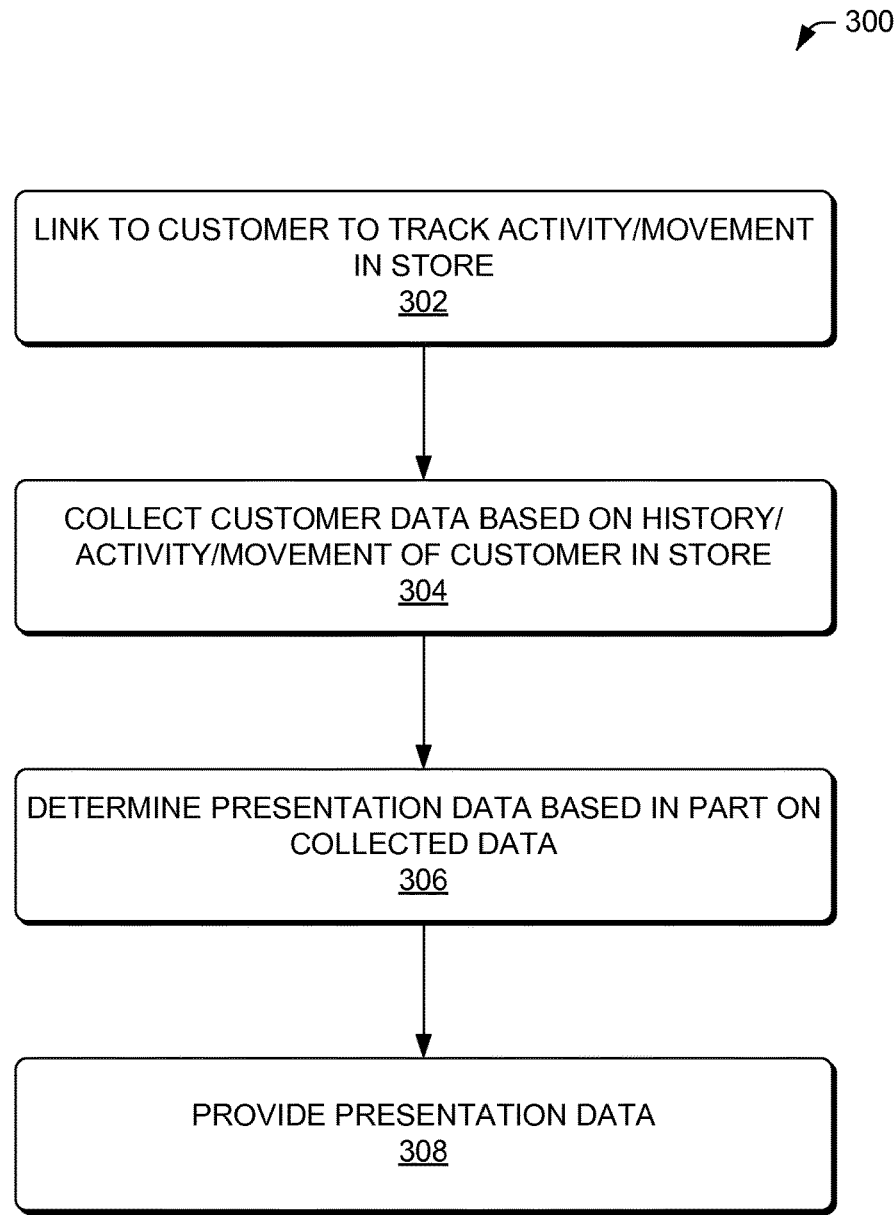
FIG. 3 is a flow diagram of an illustrative process to provide customized information to a customer in a physical store location.

FIG. 3 is a flow diagram of an illustrative process 300 to provide customized information to a customer in a physical store location. The process 300 is described with reference to the environment 100 and may be performed by the store servers 104. Of course, the process 300 may be performed in other similar and/or different environments.

At 302, the tracking module 218 may associate a tag or other trackable reference to a customer. The tracking module 218 may initiate the link during a registration process where the customer 106 willfully consents to being tracked by the store servers 104.

At 304, the tracking module 218 (and possibly the customer data module 216) may collect data for the customer. The data may be based on customer history, customer activity, and/or customer locations within the store 102. In some embodiments, the tracking module 218 may track the customer 106 as the customer moves about the store 102. The tracking module 218 may track the customer by receiving signals from the sensors 108 in response to the sensors 108 detecting the tag or other trackable reference (e.g., via RFID, optical scans, data input by the customer, biometrics, etc.). The tracking module 218 may log the location of the customer 106 and any other relevant information such as a location, a nearby product, an amount of time spent at the location, requests/feedback received from the customer at the location, and so forth. The requests/feedback may be received by the tracking module 218 through data transmitted from the device 110 and/or other devices, such as store devices (e.g., kiosks, etc.). The data obtained by the tracking module 218 may be stored in the customer data 224. In some instances, the customer data 224 may also include other data about the customer, such as data obtained from the electronic marketplace data 238.

At 306, the presentation module 220 may determine presentation to provide to the customer based on the customer data 224 collected at the operation 304. For example, the presentation module 220 may analyze the information obtained by the tracking module 218 and stored in the customer data 224. The analysis may identify information that may be relevant to the customer 106 based on the history of the customer, the customer's activity in the store 102, and/or the customer's location and movement in the store 102. For example, the presentation module 220 may determine that the customer 106 is interested in a specific produce or type of produces and may then provide additional information about the products (e.g., comparison data, technical specifications, instruction manuals, etc.), signal for a store sales associate to assist the customer, identify complementary items (e.g., accessories, other complementary items, etc.), and so forth. In some instances, the presentation module 220 may cause audio to be emitted near the customer 104 for the customer to hear and/or video to be played near the customer for the customer to see. For example, when a user is standing near a television, the presentation module 220 may cause a video to be played on a nearby display that provides product reviews for the type of television the customer is viewing.

At 308, the presentation module 220 may provide the presentation data to the customer 106. The presentation module 220 may select the relevant information from the presentation data 112 based in part on the determination at the operation 306. The presentation module 220 may provide the presentation data 112 that is customized for the customer 106 to be provided to the device 110, to nearby speaker(s), to nearby display screen(s), and to other sources near the customer that can provide a meaningful output. For example, the presentation module 220 may cause a demonstration item to perform a demonstration of an operation when the customer is near the item (e.g., an espresso machine may brew a sample cup of espresso when the customer spends a threshold amount of time near the express machine). In another example, the presentation module 220 may cause speaker(s) to emit music that is likely to be enjoyable by the customer 106 based on music previously purchased by the customer. The previous purchases of the customer may be stored in the customer data 224 may be determined from prior purchase from the store 102 and/or from purchases from the electronic marketplace and stored in the electronic marketplace data 238.

Figure 4:
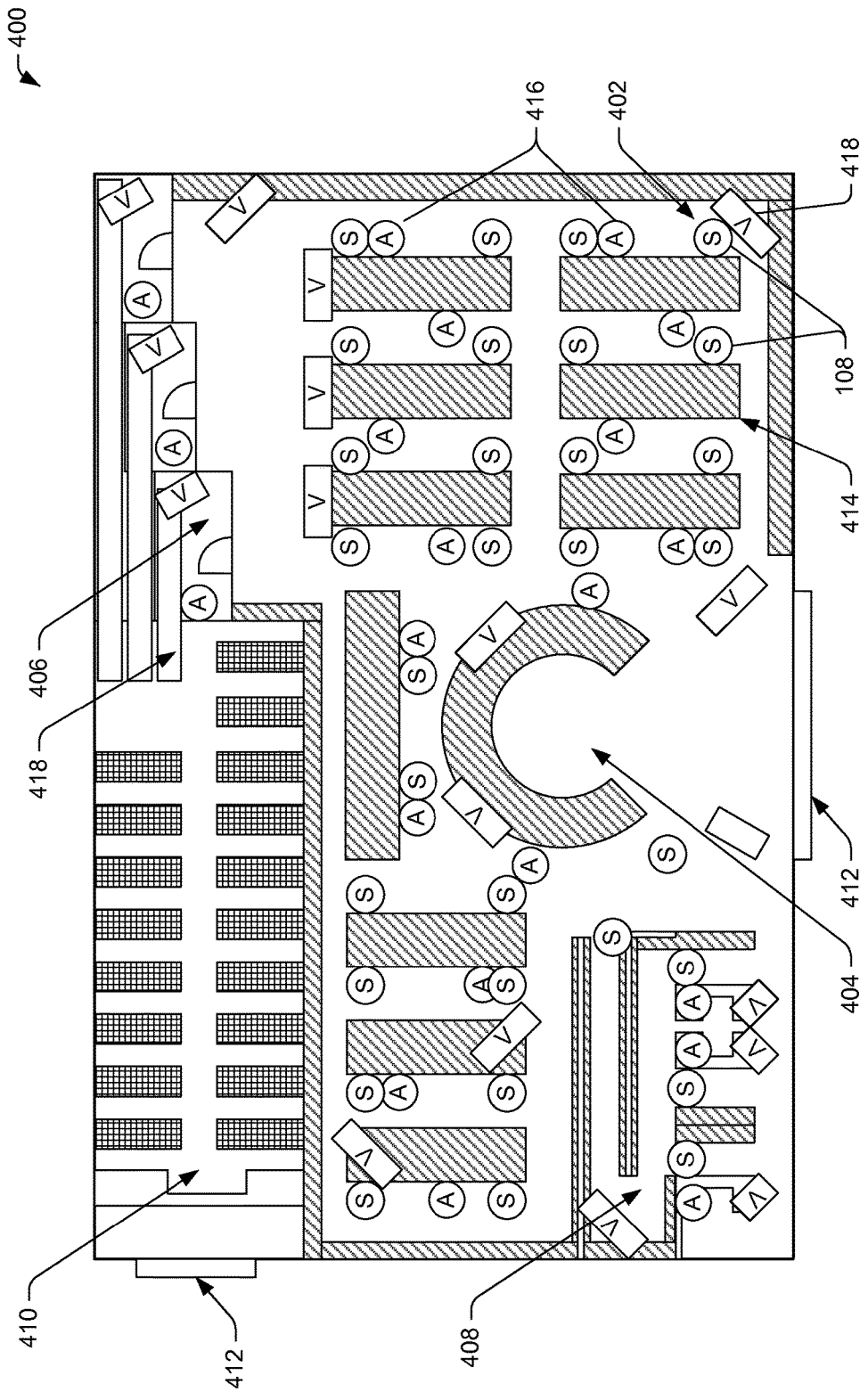
FIG. 4 is a schematic diagram of an illustrative floor plan of a physical store location that includes sensors to detect presence of a customer and further includes mechanisms to distribute customized text, audio and imagery outputs to the customer at a particular location or locations within the physical store location.

FIG. 4 is a schematic diagram of an illustrative floor plan 400 of the physical store location 102 that includes sensors to detect presence of a customer and further includes mechanisms to distribute customized text, audio and imagery outputs to the customer at a particular location or locations within the physical store location. The floor plan 400 shows numerous features that may be incorporated together in the store 102 or selectively implemented (using one or more of the features) in the store. The features include use of customizable audio/video (A/V) 402 that may be integrated with merchandise, a customized demonstration space 404, a personalized shopping space 406, smart checkout lanes 408, and a smart fulfillment center 410. Each of the features is discussed in turn. Among many other features, the floor plan 400 also shows entrances/exits 412 and item display components 414 (e.g., item display space and shelves, etc.).

The customizable A/V 402 may include audio and/or imagery (e.g., still images, video, etc.) that is used to output customized content provided by the presentation module 220 for enjoyment or use by a specific customer identified by the tracking module 218. In accordance with one or more embodiments, the customizable A/V 402 may provide sound cones, which are areas where sound generated by the audio outputs (e.g., speakers) 416 is audible by a specific customer located within a predetermined zone associated with the sound cone. The placement of the audio outputs 416 throughout the floor plan 400 may enable providing sound that "follows" the customer as the customer shops in the store. Thus, when the customer is in a first position, a first set of speakers may provide audio output that is audible to the customer and audible within a small area surrounding the customer (the predetermined zone). When the customer moves to a second location (e.g., 10 feet away, etc.), the presentation module 220 may cause the first set of speakers to discontinue the sound for that particular customer (possibly beginning to play sound for another customer), while a second set of speakers may continue, via a handoff, the audio output previously provided by the first set of speakers while the audio output is still relevant to the customer (based on decisions made by the presentation module 220). When the audio output is no longer relevant, the second set of speakers may provide different audio output to the customer. The presentation module 220 may provide video, including text and other information via display screens 418 in a similar manner (e.g., using handoffs, etc.) as described with respect to the use of the audio outputs 416.

The customized demonstration space 404 may be used to provide customized demonstrations to the customer 106 and/or a group of customers. The presentation module 220 may determine a type of presentation that may benefit customers in the store 102 and/or customers near the customized demonstration space 404. For example, when a large number of customers in the store are interested in electronic book reader devices, which may be evidenced by data collected by the tracking module 218 of the customers viewing or lingering near a display of electronic book readers, then the presentation module 220 may determine to cause a customized demonstration of one or more electronic book reader devices in the customized demonstration space 404 or in another portion of the store 102.

The personalized shopping space 406 may be a space where products are provided to the customer, such as by a conveyer belt or other automated item delivery mechanism 418. The personalized shopping space 406 may reverse the typical shopping experience where the customer moves about the store to look at stationary items. Instead, the personalized shopping space 406 may bring the items to the customer, who may remain relatively stationary in the personalized shopping space 406. The customer 106 may provide feedback and/or otherwise interact with the items in the personalized shopping space 406. For example, a first item may be provided to the customer in the personalized shopping space 406 for inspection and interaction by the customer. The customer 106 may then provide feedback (e.g., purchase, not interested, more like this, etc.). The presentation module 220 may the cause another physical item to be provided for inspection by the customer based on the feedback. The items may cycle through the personalized shopping space 406 using a conveyer belt or other automated item delivery mechanism.

The smart checkout lanes 408 may identify the customer 106 via the tracking module 218 and then direct the customer to an area (zone) that may be of most interest to the customer based on the a determination by the presentation module 220. For example, the presentation module 220 may determine that the customer has been in the store 102 for a long time, and thus may direct the customer to a checkout lane that includes food/beverages for sale whereas another customer who looked at music may be directed to a checkout lane that includes stereo headphones, and so forth. The presentation module 220 may also provide recommendations to the customer to visit other particular locations or zones within the store 102 using similar logic.

The smart fulfillment center 410 may receive purchase information from the customer 106 and then compile a bin or other collection of items to be purchased and/or picked up by the customer after purchase. For example, the purchase module 222 may transmit information to workers who may the pick products in the smart fulfillment center 410 for the customer. In some embodiments, the smart fulfillment center 410 may also provide products to the personalized shopping space 406 under direction of the presentation module 220. For example, the store servers 104 may communicate information to workers who may then place items on a conveyer belt or other automated item delivery mechanism that transports the item to/from the personalized shopping space 406.

Figure 5:
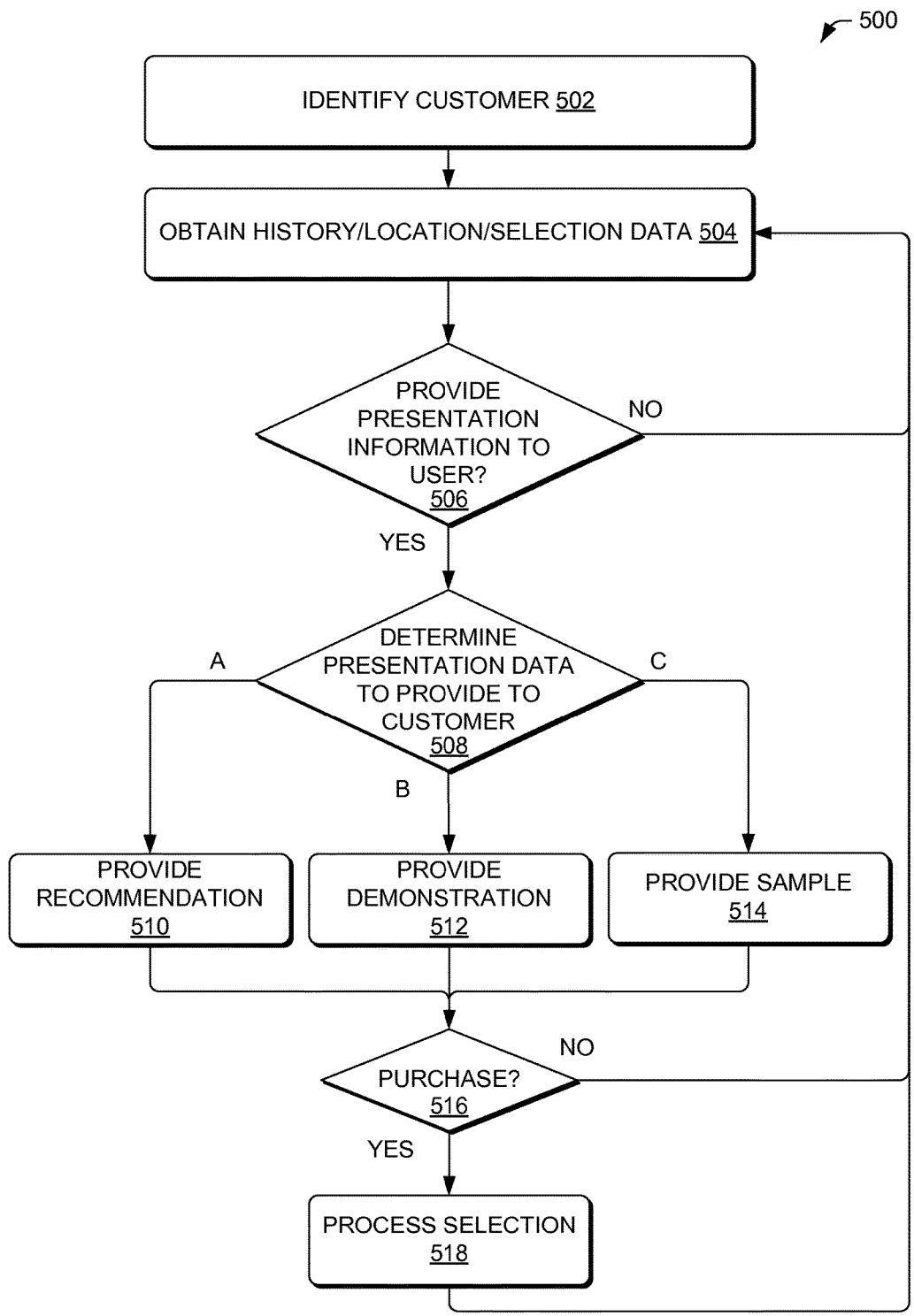
FIG. 5 is a flow diagram of an illustrative process to provide an electronic shopping assistant to assist a customer while shopping at a physical store location.

FIG. 5 is a flow diagram of an illustrative process 500 to provide an electronic shopping assistant to assist a customer while shopping at a physical store location. The process 500 is described with reference to the environment 100 and may be performed by the store servers 104. Of course, the process 500 may be performed in other similar and/or different environments.

At 502, the tracking module 218 may identify the customer 106 using the sensors 108 and/or data received from the device 110. As previously discussed, the tracking module 218 may begin tracking the customer's location and activities in the store 102 after the customer registers and consents to the tracking.

At 504, the tracking module 218 (and possibly the customer data module 216) may populate the customer data 224 based on interaction, movement, and/or feedback from the customer received by the tracking module 218. The interaction may use predictive algorithms and/or infer actions of the customer 106 based on received data about the customer, such as by determining an item the customer is viewing based on a direction that the customer is facing and/or other information determined by the sensors 108. For example the sensors may determine the items viewed or interacted with by the customer using a lookup table of items near the customer's location, image recognition of an item held by the customer, and/or other techniques. These items may then be associated with the customer 106 in the customer data 224. The customer data 224 may also include data from external sources, such as the electronic marketplace that may include electronic marketplace data 238 that indicates transactions, reviews, browsing history, and/or other information about the customer's activities outside of the store 102. The customer 106 may also volunteer information for inclusion in the customer data 224, such as by filling out a survey of interests or otherwise providing direct inputs to the customer data 224.

At 506, the presentation module 220 may determine whether to provide presentation information/data to the customer. For example, the presentation module 220 may consider whether a mechanism currently exists to provide the presentation information to the customer (e.g., customer's proximity to speakers/video displays, etc.), whether enough data is collected to provide meaningful content to the customer, when the last presentation information was provided to the customer (e.g., throttling information to avoid overload, etc.), and/or other possible considerations. When no presentation information is to be provided (following the "no" route from the decision operation 506), then the process 500 may continue at the operation 504.

When the presentation module 220 determines to provide presentation information (following the "yes" route from the decision operation 506), then the process 500 may continue at a decision operation 508. At 508, the presentation module 220 may determine what presentation information in the presentation data 112 to provide to the customer 106. Based on the information from the operation 504, the presentation module 220 may provide a recommendation at an operation 510 (via route "A"), a demonstration (or cause an item demonstration) at an operation 512 (via route "B"), and/or provide a sample at an operation 514 (via route "C"). In some instances, the presentation module 220 may cause one or more of the operations 510-514 to occur following the determination at the decision operation 508.

The recommendation at 510 may include a recommendation of complementary items, a recommendation to visit another area of the store 102, a recommendation of another store (such as a store that has inventory of a desired item), and/or other types of recommendations. The demonstration at 512 may include an audio demonstration via the audio outputs 416, a video demonstration via the display screens 418, and/or a live demonstration via a message to an associate that may perform a demonstration in the customized demonstration space 404 or another area of the store. The sample at 514 may include initiating delivery of a sample (e.g., powering on an espresso machine to make a sample latte, etc.), causing the audio outputs 416 to emit sample music (which may be recommended to the customer), causing the display screens 418 to display sample clips of a video of possible interest to the customer (e.g., sample do-it-yourself video when the customer is viewing woodworking tools, etc.).

At 516, the purchase module 222 may determine whether the customer 106 decides to purchase the item. When the customer decides to purchase the item (following the "yes" route from the decision operation 516), then the selection may be processed by the purchase module 222. The purchase module 222 may act as a virtual cart to at least temporarily store items that the customer intends to purchase during a shopping experience at the store 102. At 518, the purchase module 222 may transmit information about the items to the smart fulfillment center 410 for eventual pickup by the customer 106. In some instances, at 518, the purchase module 222 may perform a transaction with the customer to pay for the item or items.

Figure 6:
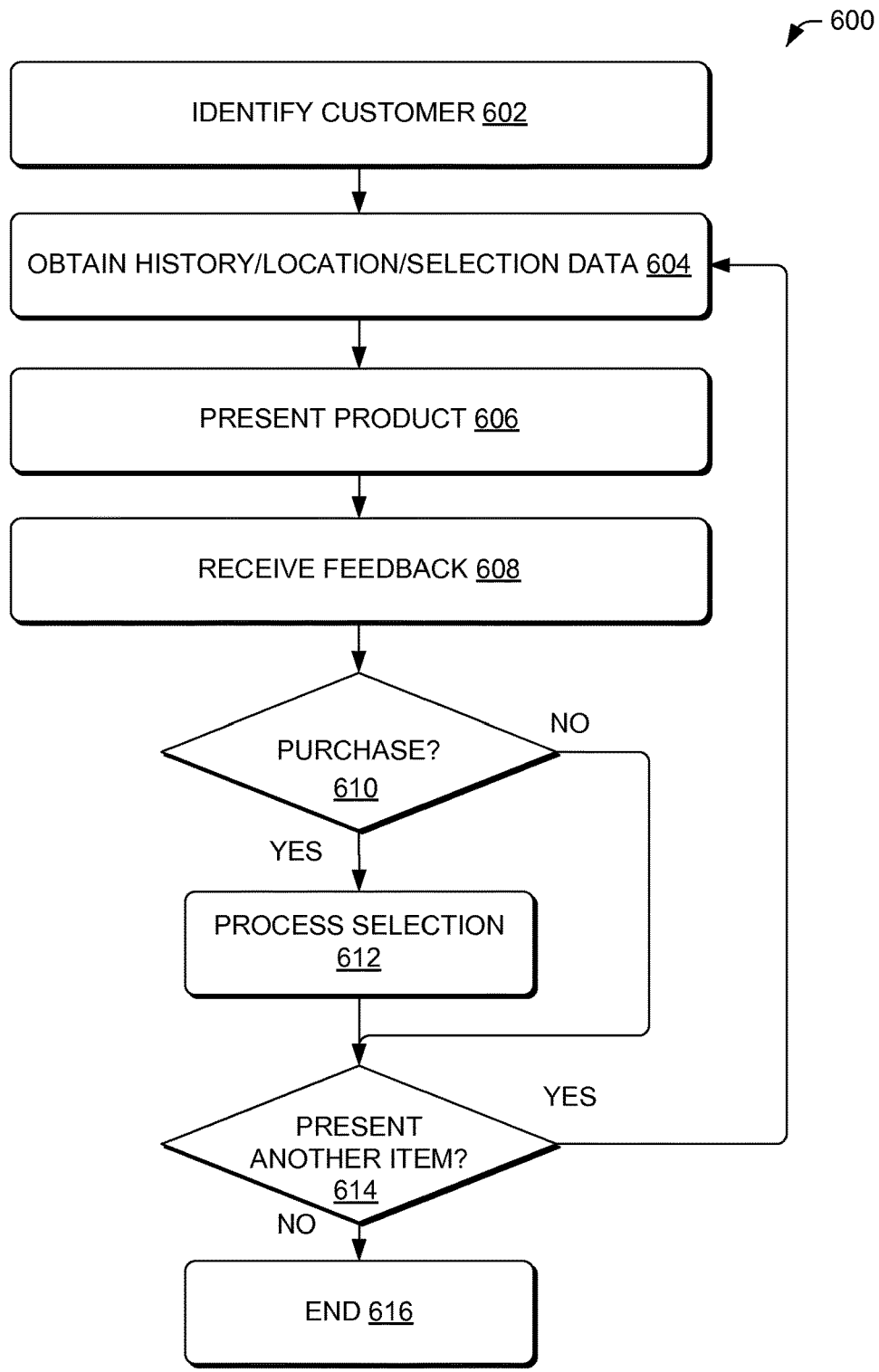
FIG. 6 is a flow diagram of an illustrative process to provide a personalized shopping space for a customer that provides physical items to the customer based on specific customer interests and feedback.

FIG. 6 is a flow diagram of an illustrative process 600 to provide the personalized shopping space 406 for a customer that provides physical items to the customer based on specific customer interests and feedback. The process 600 is described with reference to the environment 100 and may be performed by the store servers 104 using the personalized shopping space 406. Of course, the process 600 may be performed in other similar and/or different environments.

At 602, the tracking module 218 may identify the customer 106. The operation 602 may be similar to the operation 502 described above.

At 604, the tracking module (and possibly the customer data module 216) may obtain history, location, and/or selection data associated with the customer 106. The operation 604 may be similar to the operation 504 described above.

At 606, the presentation module may cause presentation of the item to the customer 106. The presentation may be caused using a conveyer belt or other automated item delivery mechanism 418. However, in some instances, the item may be delivered to the customer 106 via the audio outputs 416 and/or the display screens 418, such as when the item is media and/or outputs media (such as a gaming console, video player, etc.). The presentation module 220 may provide instructions to cause delivery of the item to the user in the personalized shopping space 406.

At 608, the presentation module 220 may receive feedback from the customer 106 about the item or items presented to the customer. The feedback may be received by the tracking module 418, processed, and then used by the presentation module 220 as selection data, etc. (e.g., stored in the customer data 112 for use in the operation 604).

At 610, the purchase module 222 may determine whether the customer 106 decides to purchase the item. When the customer decides to purchase the item (following the "yes" route from the decision operation 610), then the selection may be processed by the purchase module 222. The purchase module 222 may act as a virtual cart to at least temporarily store items that the customer intends to purchase during a shopping experience at the store 102. At 612, the purchase module 222 may transmit information about the items to the smart fulfillment center 410 for eventual pickup by the customer 106. In some instances, at 610, the purchase module 222 may perform a transaction with the customer to pay for the item or items.

Following the operation 612 or the "no" route from the decision operation 610, the presentation module 220 may determine whether to present another item to the customer 106 at a decision operation 614. For example, the presentation module 220 may determine to present another item for inspection by the customer in response to feedback about a previously presented item. When another item is to be presented, possibly in response to a request received from the customer 106 (following the "yes" route from the decision operation 614), the process 600 may advance to the operation 604 and select another item using the feedback from the customer and/or other portions of the customer data 112. When another item is not to be presented, possibly in response to a request received from the customer 106 (following the "no" route from the decision operation 614), the process 600 may end at an operation 616.

Figure 7:
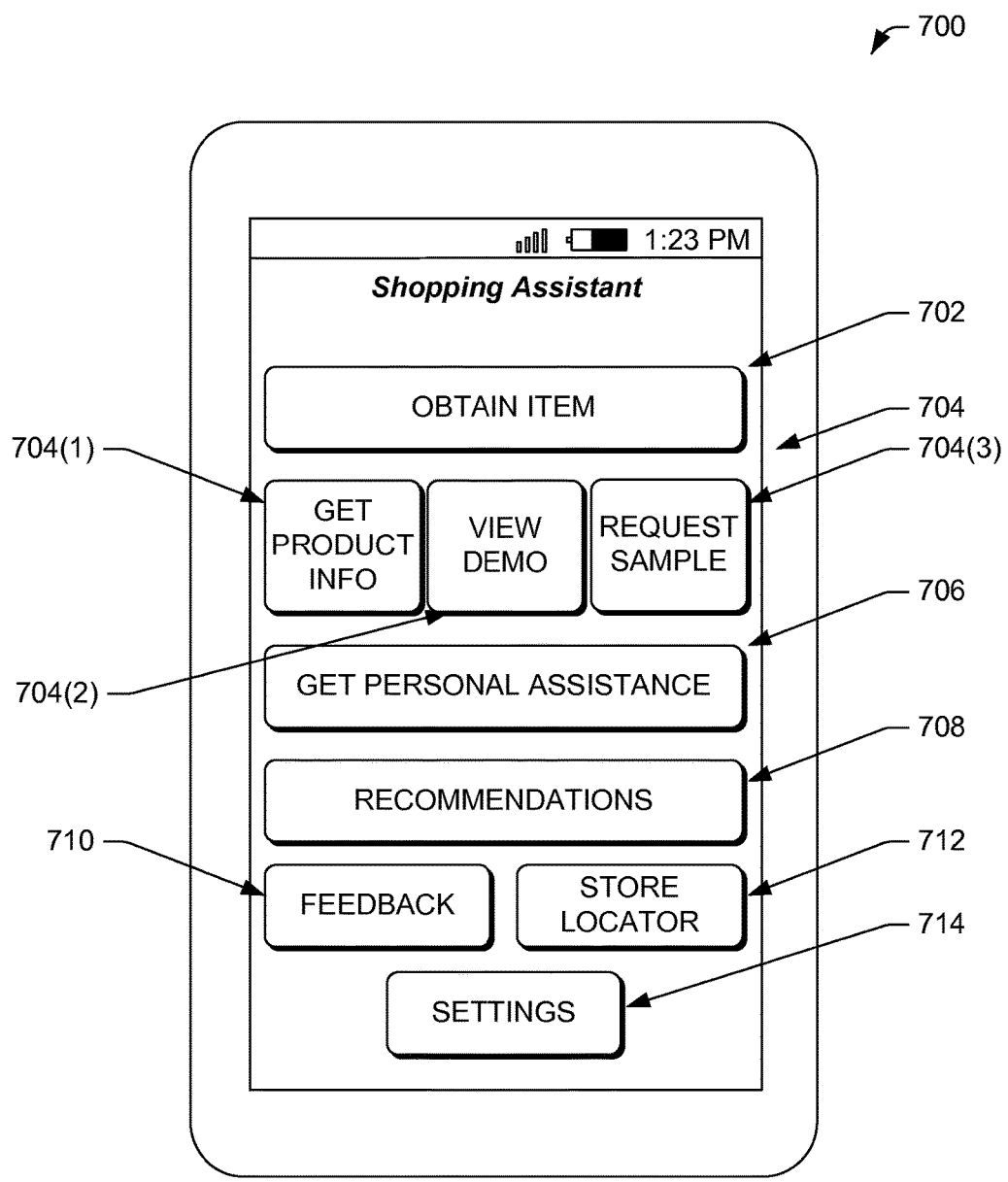
FIG. 7 is a flow diagram of an illustrative user interface (UI) that shows various features accessible via a shopping assistant application to provide a customer with a customized shopping experience.

FIG. 7 is a schematic diagram of an illustrative user interface (UI) 700 that shows various features accessible via a shopping assistant application to provide a customer with a customized shopping experience. The UI 700 may be executed and presented by the device 110 or by a store device, possibly under control of the store servers 104.

The UI 700 may include an obtain item command 702 that enables the customer to purchase or otherwise obtain an item. For example, the customer 106 may select the obtain item command 702 and then select an item to obtain. In some embodiments, the customer 106 may use the obtain item during interaction in the personalized shopping space 406 to request an item for viewing.

The UI 700 may include presentation commands 704, which may include a get product information command 704(1), a view demonstration command 704(2), and/or a request sample command 704(3). The product information command 704(1) may provide the customer with product information, which may be provided by the presentation module 220 as text or audio. For example, the presentation module 220 may provide the product information to the customer via the device 110 and/or via the audio outputs 416 and/or the display screens 418.

The UI 700 may include a personal assistance command 706 to request personal sales support by a sales associate or other person in the store 102. The personal assistance command 706 may provide a location of the customer to the sales associate or other person, who can then find and assist the customer.

The UI 700 may include a recommendations command 708 to provide recommendations to the customer 106. The recommendations may be created by the presentation module 220 using the customer data 112 (similar to the operation 510 described with reference to FIG. 5). The recommendations may include recommended items, recommended areas to visit in the store 102, and/or other types of recommendations.

The UI 700 may include a feedback command 710 to enable the user to provide feedback about an item. The feedback command 710 may be to provide feedback while the customer is interacting with items in the personalized shopping space 406 or for providing general feedback about items while the customer interacts with items while shopping within the store 102. The feedback command 710 may enable the customer to provide ratings, textual feedback (e.g., reviews), and/or other types of feedback (e.g., audio clip, video clip, photograph, etc.).

The UI 700 may include a store locator command 712 that may assist the customer to find a store that stocks an item that is currently out of stock at the store 102. The store location command 712 may also recommend other stores to the customer that may possibly complement services offered by the store 102, such as a store that provides support, installations, and/or other complementary items.

The UI 700 may include a settings command 714 that may receive preferences of the customer, including registration, deregistration, user preferences, likes/dislikes, and so forth.

The setting may influence content and frequency of delivery of content to the customer from the presentation module 220.

Figure 8:
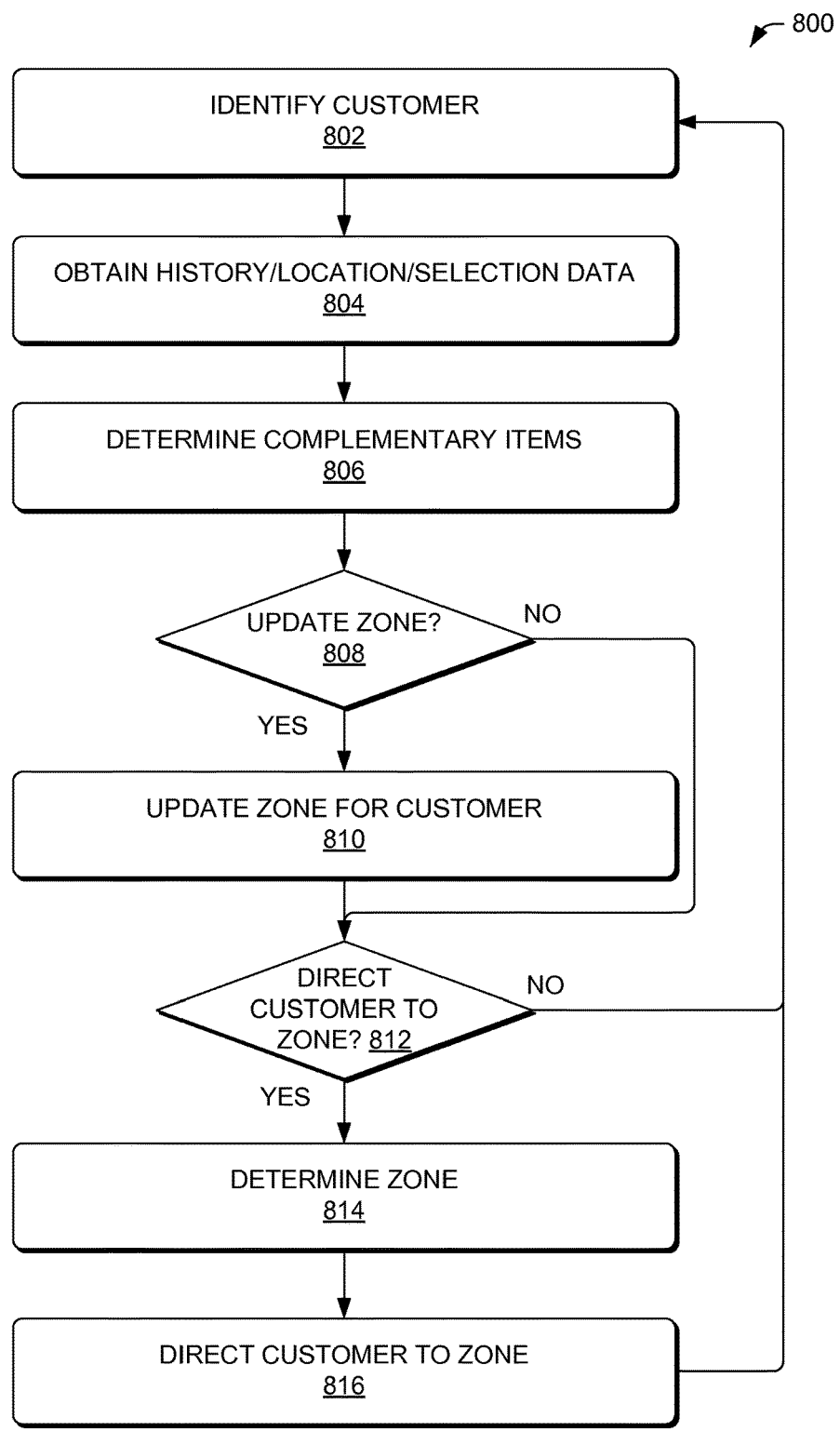
FIG. 8 is a flow diagram of an illustrative process to direct a customer to a zone that includes items of possible interest to the customer.

FIG. 8 is a flow diagram of an illustrative process 800 to direct a customer to a zone that includes items of possible interest to the customer. The process 800 may be used to direct a customer to a specific checkout lane having display items of possible interest to the customer, or to direct the customer to other areas or zones of the store 102. The process 800 is described with reference to the environment 100 and may be performed by the store servers 104. Of course, the process 800 may be performed in other similar and/or different environments.

At 802, the tracking module 218 may identify the customer 106. The operation 802 may be similar to the operation 502 described above.

At 804, the tracking module (and possibly the customer data module 216) may obtain history, location, and/or selection data associated with the customer 106. The operation 804 may be similar to the operation 504 described above.

At 806, the presentation module 220 may determine complementary items that may be of possible interest to the customer. The presentation module 220 may select the complementary items based on the customer data 112 obtained and accessible via the operation 804. For example, complementary items may include storage cases for items obtained by the customer (e.g., mobile telephone cases, etc.), food/beverages for a customer that spend a long time in the store 102, and/or other types of items that may be of interest to the customer.

At 808, the presentation module 220 may determine whether to update a zone for the customer or various customers. The zone may be a shelf, checkout lane, and/or other collection or display of merchandise, services, or other items. The zone may be updated by the presentation module 220 based at least in part on the determined complementary items at the operation 806. When the zone is to be updated (following the "yes" route from the decision operation 808), then the process 800 may proceed to an operation 810.

At 810, the presentation module 220 may cause an update to a zone for the customer. In accordance with some embodiments, a zone may be updated by reconfiguring or selectively displaying particular items in the zone. For example, shelves in a checkout lane may have items stocked on multiple sides of the rack. The rack may be repositioned to update a presentation of items in the zone, such as by presenting a side of the rack that includes at least some of the complementary items determined at the operation 806, when possible. Thus, the racks may appear to present customized items for each customer by altering which part of the rack is visible when a customer enters the zone. Other similar techniques of repositioning items may also be used to update a zone.

Following the operation 810, or when the zone is not to be updated (following the "no" route from the decision operation 808), then the process 800 may proceed to a decision operation 812. At 812, the presentation module 220 may determine whether to direct the customer to a zone. For example, the presentation module 220 may suggest to the customer to visit a zone or other location in the physical store location that includes at least some of the complementary items determined at the operation 806. When the customer is to be directed (following the "yes" route from the decision operation 812), then the process 800 may proceed to an operation 814.

In various embodiments, at 814, the presentation module 220 may determine a zone for customer to visit. For example, the presentation module 220 may determine that a particular checkout lane has some of the complementary items determined at the operation 806, and therefore may determine that the customer should go to that particular checkout lane. In another example, presentation module 220 may determine an area of the store that includes items that may be of interest to the customer and may then direct the customer or otherwise suggest to the customer to visit this area of the store.

At 816, the presentation module 220 may direct the customer 106 or otherwise suggest to the customer to visit a particular zone determined via the operation 814. For example, the presentation module 220 may suggest to the customer to use a particular checkout lane based on consideration so the complementary items at the operation 806 and other possible factors, such as a length of the line, etc.

Following the operation 816, or when the customer is not to be directed (following the "no" route from the decision operation 812), then the process 800 may proceed to the operation 802. The process 800 may then be repeated for the same customer and/or for a different customer.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:
   identifying, by one or more store servers, a customer based at least in part on a device associated with the customer;
   tracking, by the one or more store servers, physical locations of the device within a zone;
   selecting a presentation, using the one or more store servers, to provide to the customer based at least in part on a current physical location of the device within the zone and previous physical locations of the device within the zone;
   causing, by the one or more store servers, delivery of the presentation to the customer via at least one of the device or one or more other devices;
   automatically transporting, by a conveyor belt or an automated item delivery mechanism, at least one tangible item available for purchase into view of the customer at least partially in response to the current physical location of the device within the zone;
   receiving feedback from the customer at least partially in response to the presentation or transporting the tangible item into view of the customer; and
   reconfiguring, based at least in part on the feedback, the zone by automatically updating a presentation of one or more items in the zone.

2. The method as recited in claim 1, wherein: the presentation is at least one of audio data or imagery data; and
   the presentation is delivered to a stationary presentation device affixed within the zone from the one or more store servers.

3. The method as recited in claim 1, wherein:
   the presentation is at least one of audio data or imagery data; and
   the presentation is delivered wirelessly to the device from the one or more store servers, the device comprising at least one of a mobile telephone or a tablet computer.

4. The method as recited in claim 1, wherein the presentation includes at least one of specifications of the at least one tangible item available for purchase or a demonstration of functionality of the at least one tangible item available for purchase.

5. The method as recited in claim 1, wherein the presentation includes at least one of an audio sample of the at least one tangible item available for purchase or a video sample of the at least one tangible item available for purchase.

6. The method as recited in claim 1, wherein
   automatically transporting the at least one tangible item available for purchase into view of the customer is based at least in part on feedback about another item received from the customer.

7. The method as recited in claim 1, further comprising:
   obtaining historical information about the customer based at least in part on the identifying of the customer;
   wherein automatically transporting the at least one tangible item available for purchase into view of the customer is based at least in part on the historical information about the customer.

8. The method as recited in claim 1, further comprising:
   receiving a selection of the at least one tangible item available for purchase from the customer;
   adding the at least one tangible item available for purchase to a virtual shopping cart;
   determining that the customer paid for the at least one tangible item available for purchase; and
   based at least in part on determining that the customer paid for the at least one tangible item available for purchase, delivering the at least one tangible item available for purchase to the customer at a designated pickup location within the zone.

9. The method as recited in claim 1, further comprising:
   identifying the device based at least in part on an identifier associated with the device; and
   tracking the physical locations of the device within the zone based at least in part on the identifier.

10. The method as recited in claim 9, wherein the identifier is at least one of a radio frequency identifier (RFID) or an optical code able to be scanned by sensors, and wherein the tracking is performed at least in part by the sensors.

11. The method as recited in claim 9, further comprising:
    generating biometric data associated with the customer; and
    determining the identifier based at least in part on the biometric data.

12. The method as recited in claim 11, wherein generating the biometric data associated with the customer further comprises:
    performing a retinal scan of the customer to generate retinal scan data; and
    determining the identifier based at least in part on the retinal scan data.

13. The method as recited in claim 9, further comprising:
    receiving global positioning system (GPS) data from the device associated with the customer; and
    determining the identifier based at least in part on the GPS data.

14. The method as recited in claim 1, further comprising:
    causing, at a first time, the delivery of the presentation via a second device at a first physical location within the zone located within a predetermined distance of the device; and causing, at a second time, the delivery of the presentation via a third device at a second physical location within the zone located within the predetermined distance of the device.

15. A store system, comprising:
one or more processors; and
a computer-readable medium having thereon computer-executable instructions, that when executed by the one or more processors, configure the store system to:
- identify a customer based at least in part on a device associated with the customer;
- track physical locations of the device within a zone;
- determine an interaction with the item within the zone by the customer;
- select a presentation to provide to the customer based at least in part on a current physical location of the device within the zone and the interaction with the item within the zone by the customer;
- cause delivery of the presentation to the customer via the device; and
- automatically transport into view of the customer, by a conveyor belt or an automated item delivery mechanism, at least one tangible item available for purchase at least partially in response to the current physical location of the device within the zone being within a threshold distance of the at least one tangible item available for purchase.

16. The store system as recited in claim 15, wherein the computer-executable instructions further configure the store system to:
- receive, from a sensor within a physical store location, location data associated with the device; and
- track the physical locations of the device based at least in part on the location data.

17. The store system as recited in claim 15, wherein:
- the presentation is at least one of audio data or imagery data; and
- the computer-executable instructions further configure the store system to cause delivery of the presentation to a stationary presentation device affixed within the zone.

18. The store system as recited in claim 15, wherein:
- the presentation is at least one of audio data or imagery data; and
- the computer-executable instructions further configure the store system to cause delivery of the presentation wirelessly to the device, the device comprising at least one of a mobile telephone or a tablet computer.

19. One or more computer-readable media storing computer-executable instructions that, when executed on one or more processors of one or more store systems, configure the one or more store systems to performs acts comprising:
- identifying a customer based at least in part on a device associated with the customer;
- tracking physical locations of the device within a zone;
- determining an interaction with the item within the zone by the customer;
- selecting a presentation to provide to the customer based at least in part on a current physical location of the device within the zone and the interaction with the item within the zone by the customer;
- causing a delivery of the presentation to the customer via one or more other devices; and
- causing transportation, by an automated delivery mechanism, of at least one tangible item available for purchase into view of a customer at least partially in response to the current physical location of the device within the zone being within a threshold distance of the at least one tangible item available for purchase.

20. The one or more computer-readable media as recited in claim 19, wherein the presentation includes at least one of an audio sample of the at least one tangible item available for purchase or a video sample of the at least one tangible item available for purchase.

21. The one or more computer-readable media as recited in claim 19, wherein the presentation includes a recommendation for the customer to visit a location within the zone, the recommendation based at least in part on the previous physical locations of the device within the zone.

22. The one or more computer-readable media as recited in claim 19, wherein causing the transportation of the at least one tangible item available for purchase into view of the customer is based at least in part on feedback received from the customer about another item.

23. The one or more computer-readable media as recited in claim 19, further comprising:
- obtaining historical information about the customer based at least in part on an identification of the customer;
- wherein causing the transportation of the at least one item into view of the customer is based at least in part on the historical information about the customer.

24. The store system as recited in claim 15, wherein the computer-executable instructions further configure the store system to:
- determine an identifier associated with the device; and
- identify the device based at least in part on the identifier;
- wherein tracking the physical locations of the device within the zone is performed based at least in part on the identifier.

25. The store system as recited in claim 15, wherein the computer-executable instructions further configure the store system to:
- receive, from the device, registration data associated with the device; and
- register the device with the store system based at least in part on the registration data.

26. The method as recited in claim 1, wherein reconfiguring the zone includes at least one of repositioning the one or more items in the zone or selectively displaying particular items in the zone.

27. The store system as recited in claim 15, wherein determining the interaction with the item within the zone by the customer includes at least one of determining that the customer viewed the item based at least in part on a direction of sight of the customer or determining that the customer touched the item.

* * * * *